(12) United States Patent
Bicking

(10) Patent No.: US 6,172,500 B1
(45) Date of Patent: Jan. 9, 2001

(54) TARGET DESIGN FOR GEARTOOTH SENSOR WITH MINIMAL NUMBER OF UNIQUE SEGMENTS COMBINED IN NONREPEATING FASHION

(75) Inventor: Robert E. Bicking, Freeport, IL (US)

(73) Assignee: Honeywell International INC, Morristown, NJ (US)

( * ) Notice: Under 35 U.S.C. 154(b), the term of this patent shall be extended for 0 days.

(21) Appl. No.: 09/103,047

(22) Filed: Jun. 23, 1998

(51) Int. Cl.[7] .............................. G01B 7/14; G01B 7/30; F02P 5/00
(52) U.S. Cl. .............................. 324/207.22; 324/207.25; 341/15; 123/406.58
(58) Field of Search ................ 324/207.22, 207.24, 324/207.25, 173, 174; 341/6, 15; 123/617, 406.58, 406.59, 406.63

(56) References Cited

U.S. PATENT DOCUMENTS 5,264,789 * 11/1993 Braun et al. ................... 324/207.25
5,469,054    11/1995 Bicking ........................ 324/207.2

\* cited by examiner

*Primary Examiner*—Walter E. Snow
(74) *Attorney, Agent, or Firm*—Roland W Norris; Andrew A. Abeyta

(57) ABSTRACT

A geartooth target providing a consistent magnetic signal for each feature type with unambiguously readable features has three unique 30° segments, each segment ending with a falling edge transition, the segments placed to have a unique pattern of segments every 90°.

19 Claims, 1 Drawing Sheet

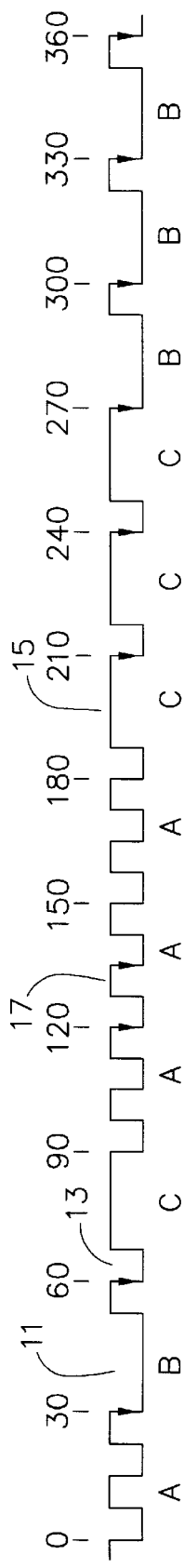
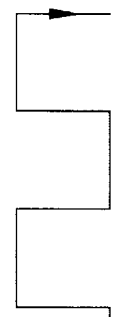
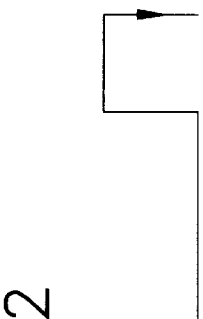

TARGET DESIGN FOR GEARTOOTH SENSOR WITH MINIMAL NUMBER OF UNIQUE SEGMENTS COMBINED IN NONREPEATING FASHION

BACKGROUND OF THE INVENTION

1. Field of the Invention

The present invention relates generally to magnetic sensors and specifically to magnetic sensors of the type wherein a magnetic transducer reads a ferromagnetic target configured in a unique pattern to yield information about a mechanical application.

2. Discussion of the Related Art

Many types of magnetic sensors are known in the art. Many of these use Hall effect or magnetoresistive (MR) transducers combined within a magnetic or ferromagnetic target having a pattern of features keyed to details within a mechanical apparatus being monitored by the magnetic sensor. These features may be the magnetic signature of a magnetized target or the presence or absence of ferromagnetic metal in various sizes on a metal target placed near the transducer. Exemplary of one such system is U.S. Pat. No. 5,469,054 to Bicking.

When the metal target is circular in shape the sensing system is called a "gear tooth sensor" from the resemblance of the target to a toothed mechanical gear. These gear tooth sensors are often used in the automotive arts wherein the target is linked to crankshaft for use in engine control. Sensor designers continually seek refinement of the target system to improve engine control.

SUMMARY OF THE INVENTION

The present invention provides a scheme of gear tooth sensing wherein the target is optimized to provide a hard edge transition, i.e. a tooth-to-slot or slot-to-tooth transition at least every 30° for use in fuel injection, spark ignition, and misfire control. Three different 30° segment configurations are provided which have features optimally configured to provide a sufficient number of timing signals without providing so many feature transitions that the engine control computer is over loaded. The 30° segments are ordered to provide a unique feature pattern over any 90° segment of the target for correct crank angle detection.

The target is optimized to provide unambiguously readable features, i.e. teeth and slots, which provide consistent magnetic signal signals from the transducer. The features are of only two sizes, wide and narrow. Therefore, according to the present invention, the narrow slots are made sufficiently wide to avoid fringing effects so that a narrow slot will give the same level of transducer output as a wide slot. Also, to be unambiguously readable the size of the large features are approximately three times the size of the small features in degree angles.

While the numbers and sizes of the specific embodiments herein may refer to specific engine types and sensor configurations it will be appreciated that the principles elucidated herein can be applied to a variety of mechanical apparatus and their sensing systems.

BRIEF DESCRIPTION OF THE DRAWINGS

The present invention will be more fully and completely understood from a reading of the Description of the Preferred Embodiment in conjunction with the drawings, in which:

FIG. 1 is a linear representation of a 360° geartooth target having an arrangement of three unique segments of 30° according to the present invention.

FIGS. 2–4 detail the feature configuration of the three unique segments used to explain the present invention.

FIG. 5 is a chart showing how each 90° segment of the target contains a unique combination of three 30° segments.

DETAILED DESCRIPTION OF THE PREFERRED EMBODIMENT

Throughout the Description of the Preferred Embodiment, like components will be identified by like reference numerals.

As seen in FIG. 1, a linear representation of a 360° geartooth target 12 is shown to have an arrangement of three unique 30° segments, referenced as A, B. and C. It will be appreciated that the combination of segments shown would be arranged on a geartooth target in circular fashion spanning a 360° circumference in the preferred embodiment. The present invention could also be useful for noncircular magnetic sensing systems needing regular timing marks and position identification similar to that of automotive engine uses. The target configuration, while shown as a single track, could of course be combined with its complementary, or negative image, counterpart in the manner of U.S. Pat. No. 5,469,054. The information contained on the target is encoded by use of two sizes of two features, i.e. targets and slots; yielding four feature types: wide slot 11, narrow slot 13, wide tooth 15, and narrow tooth 17.

It is desirable to provide a consistent magnetic signal with equal field magnitudes between wide and narrow features meaning that narrow slots 13 cannot be so narrow as to be affected by fringing affects which will make the slot signal vary as a function of width. Due to inherent limitations in common Hall effect or magnetoresistive transducer sensing systems, the width of the slot as measured at the periphery of the target should be 10 millimeters or greater so that the transducer has sufficient time to reach its base line output whether the slot is narrow or wide. Assuming an arbitrarily selected target diameter of 160 millimeters the minimum slot size and degrees would then be: 360°×10 millimeters÷160 millimeters×II=7.16°. This is rounded up to 7.5° for a determination of the minimum degree angles of the small features.

In order to insure that target features are unambiguously read during engine start up, a size ratio of large to small between features is selected so that the large features are at least two times and preferably, three times greater than the small features. Because the small features are 7.5° the large tooth and slot features should be 22.5°, taking into consideration the configuration as in FIGS. 3 and 4 where segments are configured with one small feature and one large feature to equal 30°.

A timing signal for control of fuel injection, spark ignition and misfire detection must occur at least every 30° degrees of crank shaft rotation for 4, 6 and 8 cylinder engines. This allows grouping three segments for an 8 cycle engine, 4 segments for a 6 cycle engine and 6 segments for a 4 cycle engine. Less timing signals than this would mean that time based extrapolation would occur over too great an angle, leading to timing errors when engine speed varies. But, too great of a number of timing signals might lead to overload of the engine control computer. Thus, segments A, B, and C illustrated in FIGS. 2, 3 and 4, respectively, all end with a falling edge, or tooth-to-slot transition. Only one of the three segments, segment A, has an "extra" falling edge transition between the beginning and end of its 30° segment.

It is also desirable to have a pattern of large and small teeth and slots i.e. features, which enables detection of the correct crank angle, i.e., know exactly where the crank shaft angle is in its operative cycle, after less than one revolution of the crank shaft to minimize engine start up time. Because there are twelve different 30° segments around the circumference of the target it is necessary to have at least three unique segments in order to establish a unique pattern for every 90° segment on the wheel. Stated another way, after every 30° segment rotation a new pattern of three segments has emerged. This is clearly illustrated by viewing FIGS. 1 and 5 wherein it will be noted that the layout of segments A, B, and C in the illustrated order leads to the desired result of no three 30° segment series being the same throughout rotation of the target rotation. Thus, any 90° rotation of the target will yield a unique combination of segments detailing where the crank shaft angle is in its operation cycle.

While the preferred embodiment has been described in terms of 30° timing signals and 90° crank shaft angle identification it will be apparent to the ordinarily skilled artisan that by following the teachings of the present invention other engine cylinder configurations can be dealt with using a geartooth sensing system according to the present invention.

While the present invention has been described in terms of a specific embodiment, it will of course be appreciated that many variations will occur to a person of ordinary skill in the art and that the present invention may be implemented in a variety of electrical, hardware and software formats in either analog or digital domains.

Having thus described the invention I claim:

1. A target design for a geartooth sensor comprising:
   (a) a first segment of x degrees where x=360÷ the number of timing signals desired;
   (b) a second segment of x degrees;
   (c) a third segment of x degrees;
   (d) each of the first, second, and third segments having a transition edge at the end of the segment; and
   (e) each segment having a unique tooth-to-slot feature configuration.

2. The target design according to claim 1 wherein:
   the segments are arranged such that each three segment series pattern on the target is unique.

3. The target design according to claim 1 wherein:
   on the target there is a large feature size and a small feature size.

4. The target according to claim 3 wherein:
   there is only a large feature size and a small feature size.

5. The target according to claim 3 wherein:
   the small feature size is determined by the formula:

$$\frac{360 \times \text{minimum slot size}}{\text{target diameter} \times \pi}$$

6. The target according to claim 3 wherein:
   the large size features are at least two times the angular size of the small features.

7. The target according to claim 3 wherein:
   the small feature size is greater than or equal to 10 millimeters at the outer edge of the features.

8. The target according to claim 6 wherein:
   the small features are 7.5 degrees and the large features are 22.5 degrees.

9. The target according to claim 3 wherein:
   the target diameter is approximately 160 millimeters and the minimum feature size is 7.5 degrees.

10. The target according to claim 3 wherein:
    the first segment is comprised of interspersed small slots and small teeth.

11. The target according to claim 3 wherein:
    the second segment is comprised of one small feature and one large feature, the features being of opposite type.

12. The target according to claim 3 wherein:
    the third segment is the complementary image of the second segment.

13. The target according to claim 10 wherein:
    the third segment is the complementary image of the second segment.

14. The target design according to claim 1 wherein:
    the transition edge at the end of each segment is a tooth-to-slot edge.

15. A target design for a geartooth sensor comprising:
    (a) a first segment A of 30 degrees;
    (b) a second segment B of 30 degrees;
    (c) a third segment C of 30 degrees;
    (d) each segment having a transition edge at the end of the segment;
    (e) each segment having a unique configuration of features;
    (f) the features being selected from the group comprising small teeth, small slot, large teeth, large slot;
    (g) the segments arranged about the circumference of the target so that every three segment set is a unique pattern of features.

16. The target design according to claim 15 wherein:
    on the target there is a large feature size and a small feature size.

17. The target design according to claim 16 wherein:
    there is only a large feature size and a small feature size.

18. The target according to claim 15 wherein:
    the large size features are about three times the angular size of the small features.

19. The target design according to claim 15, wherein:
    the transition edge at the end of each segment is a tooth-to-slot edge.

* * * * *